(12) United States Patent
Tamhankar et al.

(10) Patent No.: US 6,551,959 B2
(45) Date of Patent: Apr. 22, 2003

(54) CATALYTIC MONOLITH SUBSTRATE MADE OF CERIA AND TITANIA

(75) Inventors: Satish S. Tamhankar, Scotch Plains, NJ (US); Narayanan Ramprasad, Hillsborough, NJ (US); YuDong Chen, Bridgewater, NJ (US); Mark S. Tomczak, Hillsborough, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/788,487

(22) Filed: Feb. 21, 2001

(65) Prior Publication Data

US 2001/0041159 A1 Nov. 15, 2001

Related U.S. Application Data

(63) Continuation-in-part of application No. 09/517,830, filed on Mar. 2, 2000, now Pat. No. 6,458,334.

(51) Int. Cl.[7] .................................................. B01J 23/00
(52) U.S. Cl. ...................................................... 502/304
(58) Field of Search .............................. 423/263, 418.2, 423/651; 502/304

(56) References Cited

U.S. PATENT DOCUMENTS

| | | | |
|---|---|---|---|
| 4,048,091 A | | 9/1977 | Barnaba |
| 4,522,894 A | | 6/1985 | Hwang et al. |
| 4,537,873 A | * | 8/1985 | Kato et al. |
| 4,844,837 A | | 7/1989 | Heck et al. |
| 4,897,253 A | | 1/1990 | Jenkins |
| 4,927,799 A | * | 5/1990 | Matsumoto et al. |
| 5,232,889 A | * | 8/1993 | Blanchard et al. |
| 5,368,835 A | | 11/1994 | Choudhary et al. |
| 5,441,581 A | | 8/1995 | Van den Sype et al. |
| 5,510,056 A | | 4/1996 | Jacobs et al. |
| 5,580,536 A | * | 12/1996 | Yao et al. |
| 5,639,401 A | | 6/1997 | Jacobs et al. |
| 5,648,582 A | | 7/1997 | Schmidt et al. |
| 5,658,497 A | | 8/1997 | Kumar et al. |
| 5,785,774 A | | 7/1998 | Van Den Sype et al. |
| 5,856,585 A | | 1/1999 | Sanfilippo |
| 5,883,138 A | | 3/1999 | Hershkowitz et al. |
| 5,976,721 A | | 11/1999 | Limaye |
| 6,051,162 A | | 4/2000 | Van den Sype |

FOREIGN PATENT DOCUMENTS

| | | |
|---|---|---|
| EP | 303438 A2 | 2/1989 |
| EP | 548679 A1 | 6/1993 |
| EP | 640561 A1 | 3/1995 |
| GB | 1399137 | 6/1975 |
| JP | 11-342334 | * 12/1999 |
| WO | 93/01130 | * 1/1993 |
| WO | WO 99/35082 | 7/1999 |
| WO | WO 99/48805 | 9/1999 |

OTHER PUBLICATIONS

"Tape Cast Solid Oxide Fuel Cells for the Direct Oxidation of Hydrocarbons", Park et al., *Journal of the Electrochemical Society*, 148 (5), pp. A443–A447, 2001, No month.

"Catalytic Partial Oxidation of Methane to Synthesis Gas Over Ni–CeO$_2$", Zhu et al., *Applied Catalysis A*: General 208, pp. 403–417 (2001), No month.

"Catalytic Partial–Oxidation of Methane on a Ceria–Supported Platinum Catalyst for Application in Fuel Cell Electric Vehicles", Pino et al., *Applied Catalysis A*: General 225, pp. 63–75 (2002), No month.

Partial Oxidation of Methane Using The Redox of Cerium Oxide by Kiyoshi Otsuka, Tetsuya Ushiyama and Ichiro Yamanaka; Chemistry Letters, pp. 1517–1520, 1993, No month.

Ceria–Based Anodes For The Direct Oxidation of Methane in Solid Oxide Fuel Cells by E.S. Putna, J. Stubenrauch, J.M. Vohs, and R.J. Gorte; Langmuir 1995, 11, 4832–4837, No month.

Sintered Ceria: A New Dense and Fine Grained Ceramic Material by J.F. Baumard, C. Gault and A. Argoitia; Journal of the Less–Common Metals, 127 (1987) 125–130, No month.

"A Comparative Study of Oxygen Storage Capacity Over Ce$_{0.6}$Zr$_{0.4}$O$_2$ Mixed Oxides Investigated by Temperature–Programmed Reduction and Dynamic OSC Measurements", by Hickey et al., *Catalysis Letters*, vol. 72, No. 1–2, pp. 45–50 (2001), No month.

"Effect of Ceria Structure on Oxygen Migration for Rh/Ceria Catalysts", by Cordatos et al., J. Phys. Chem., 100, 785–789 (1996), No month.

* cited by examiner

*Primary Examiner*—Steven Bos
(74) *Attorney, Agent, or Firm*—Philip H. Von Neida; Salvatore P. Pace

(57) ABSTRACT

A process and a metal catalyst are provided for the partial oxidation of hydrocarbons to produce hydrogen and carbon monoxide. The process is conducted by contacting a mixture of a hydrocarbon-containing gas and an oxygen-containing gas in the presence of a metal catalyst. The metal catalyst is a transition or noble metal supported on a ceria monolith substrate. Partial oxidation of hydrocarbons can be carried out at low initiation temperatures with high product yields.

6 Claims, No Drawings

CATALYTIC MONOLITH SUBSTRATE MADE OF CERIA AND TITANIA

CROSS REFERENCE TO RELATED APPLICATIONS

This application is a continuation-in-part of U.S. patent application Ser. No. 09/517,830, entitled "Partial Oxidation Process," filed on Mar. 2, 2000, now U.S. Pat. No. 6,458,334, which is herein incorporated by reference.

FIELD OF THE INVENTION

The present invention relates to the partial oxidation of hydrocarbons, and more particularly, to the partial oxidation of hydrocarbons to produce hydrogen and carbon monoxide in the presence of a metal catalyst.

BACKGROUND OF THE INVENTION

The conversion of hydrocarbons to hydrogen and carbon monoxide containing gases is well known in the an. Examples of such processes include catalytic steam reforming, autothermal catalytic reforming, catalytic partial oxidation and non-catalytic partial oxidation. Each of these processes has advantages and disadvantages and produce various ratios of hydrogen and carbon monoxide, also known as synthesis gas.

Partial oxidation is an exothermic reaction wherein a hydrocarbon gas, such as methane, and an oxygen-containing gas, such as air, are contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon containing gases, such as natural gas or naphtha to hydrogen ($H_2$), carbon monoxide (CO) and other trace components such as carbon dioxide ($CO_2$), water ($H_2O$) and other hydrocarbons. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° C. and often in excess of 1,000° C., and pressures up to 150 atmospheres. In some reactions, steam or carbon dioxide can also be injected into the combustion chamber to modify the synthesis gas product and to adjust the ratio of hydrogen to carbon monoxide.

More recently, partial oxidation processes have been disclosed in which the hydrocarbon gas is contacted with the oxygen-containing gas at high space velocities in the presence of a catalyst such as a metal deposited on a ceramic foam monolith support. The monolith supports are impregnated with a noble metal such as platinum, palladium or rhodium, or other transition metals such as nickel, cobalt chromium and the like. Typically, these monolith supports are prepared from solid refractory or ceramic materials such as alumina, zirconia, magnesia and the like. During operation of these reactions, the hydrocarbon feed gases and oxygen-containing gases are initially contacted with the metal catalyst at temperatures in excess of 350° C., typically in excess of 600° C., and at a standard gas hourly space velocity (GHSV) of over 10,000 $hr^{-1}$, and often over 100,000 $hr^{-1}$.

A drawback of these prior art partial oxidation processes is the relatively high temperature required for initiating the reaction. As stated above, the partial oxidation reaction is exothermic and once the reaction is started, the heat of the reaction will maintain the elevated temperature without the addition of external heat energy. However, since the process requires temperatures in excess of 350° C. to start or initiate the reaction, an external heat source is often required. Of course, this requires additional capital costs and adds engineering complexities to the process thereby reducing its commercial attractiveness. Therefore, there is an ongoing need for other alternative methods of initiating the reaction at lower temperatures.

Furthermore, during the formation of synthesis gas by partial oxidation of hydrocarbons, small amounts of $H_2O$ and $CO_2$ are also formed as a result of a combustion reaction. The combustion reaction is not desirable because it competes with the partial oxidation reaction for the available oxygen source, and results in lower than expected conversion of the hydrocarbons. Thus, it is desirable to minimize the formation of combustion products such as $H_2O$ and $CO_2$ and increase the selectivity for the desired products, $H_2$ and CO.

SUMMARY OF THE INVENTION

The present invention relates to partial oxidation of hydrocarbons using a metal catalyst. One aspect of the invention provides an improved process for the catalytic partial oxidation of hydrocarbons to produce hydrogen and carbon monoxide. The process permits the reaction to be initiated at lower temperatures than previously possible, thereby reducing operating and capital costs. The inventive process employing a metal catalyst on a ceria monolith support also exhibits higher conversions of hydrocarbons to synthesis gas and higher selectivity to hydrogen and carbon monoxide.

In one aspect, the invention provides a process for the partial oxidation of hydrocarbons to produce hydrogen and carbon monoxide with less than 3%, preferably less than about 2% carbon dioxide. The process comprises contacting a mixture of a hydrocarbon-containing feed gas and an oxygen-containing feed gas with a catalytically effective amount of a reduced metal catalyst consisting essentially of a transition or noble metal selected from the group of nickel, cobalt, iron, platinum, palladium, iridium, rhenium, ruthenium, rhodium, osmium and combinations thereof supported on or in a ceria monolith support at a pressure of between about 1 and 20 atmospheres, with the feed gas mixture flowing at a standard gas hourly space velocity of about 50,000 to about 500,000 $hr^{-1}$, and a linear velocity of about 0.5 to 5.0 feet per second (f/s).

In another aspect, the invention provides a process for the partial oxidation of hydrocarbons to produce hydrogen and carbon monoxide by contacting a metal catalyst consisting essentially of a transition or noble metal selected from the group of nickel, cobalt, iron, platinum, palladium, iridium, rhenium, ruthenium, rhodium and osmium and combinations thereof supported on or in a ceria monolith support with a reducing environment to substantially reduce the metal catalyst (including the ceria monolith support) and subsequently contacting the substantially reduced metal catalyst with a mixture of a hydrocarbon-containing feed gas and an oxygen-containing feed gas, where the partial oxidation of hydrocarbons having between one and five carbon atoms can be initiated at temperatures less than about 200° C.

In another aspect, the invention provides a monolith substrate for supporting a catalyst for use in catalytic reactions. The monolith substrate comprises titania and ceria, with a titania concentration of preferably between about 0.1% and about 3% by weight and between about 75% and about 99.9% ceria.

In yet another aspect, the invention provides a metal catalyst comprising a transition or noble metal supported by a monolith substrate comprising between about 0.1% and about 3% titania and between about 75% and about 99.9% ceria.

In a further aspect of the invention, a process is provided for partial oxidation reaction of a hydrocarbon by contacting a feed gas mixture with a metal catalyst comprising a transition or noble metal supported by a monolith substrate comprising about 1% by weight of titania and about 99% of ceria.

DETAILED DESCRIPTION

The present invention relates to partial oxidation of hydrocarbons by contacting a mixture of hydrocarbon-containing gas and an oxygen-containing gas with a catalytically effective amount of a reduced metal catalyst. One aspect of the invention relates to a process that provides high yields of synthesis gas and less than about 3% (by volume) each of carbon dioxide ($CO_2$) and water ($H_2O$). In some preferred embodiments, carbon dioxide of less than about 2% and most preferably less than about 1% are also achieved. Furthermore, improved $CO:CO_2$ ratios of at least about 4, preferably at least about 10, are also obtained. Another aspect of the invention provides an improved partial oxidation process in which the initiation temperature can be below about 200° C., preferably below about 100° C. The present process either reduces or eliminates the need for an external heat source to initiate the reaction thereby increasing the commercial attractiveness of the process. Yet another aspect of the invention relates to a ceria monolith substrate for supporting a catalyst for catalytic reactions, with the ceria monolith substrate further comprising a relatively small amount of titania, e.g., up to about 3%, preferably between about 0.1% and about 3%, more preferably between about 0.5% and about 1.5%, and most preferably about 1% by weight, The hydrocarbon-containing feed gas, which can be used with the present invention, will typically contain $C_1$–$C_8$ alkanes or alkenes, with the $C_1$–$C_5$ alkanes preferred and methane most preferred. Of course, natural gas and certain refinery off gases containing methane or higher hydrocarbons can also be employed. Alternatively, gasoline, diesel, methanol and other sources of fuel maybe adapted for use in the present process. The oxygen-containing gas is typically air, but can include air enriched with oxygen, oxygen mixed with other gases, or even pure oxygen.

The hydrocarbon-containing feed gas and the oxygen-containing feed gas can be in various ratios in the feed gas mixture. The precise mixture of feed gases introduced into the reaction zone will depend on the particular hydrocarbons chosen and the amount of oxygen necessary to conduct the partial oxidation reaction. Operable ratios can be easily determined by one skilled in the art. For the production of synthesis gas from natural gas or methane, it is preferred that the volumetric ratio of natural gas to oxygen present in the feed gas mixture exhibit a carbon to oxygen ($C:O_2$) ratio from about 1.5 to 2.0, and more preferably from about 1.6 to 1.9.

The metal catalysts employed in the present invention are monolith support structures composed primarily of ceria with a washcoat of ceria and coated or impregnated with a transition metal or combinations thereof. As used herein, "metal catalyst" refers to the entire catalyst structure including the metal and the monolith support or monolith substrate.

A monolith support is generally a ceramic foam-like or porous structure formed from a single structural unit having passages disposed in either an irregular or regular pattern with spacing between adjacent passages. The single structural unit is used in place of conventional particulate or granular catalysts which are less desirable in the present process. Examples of such irregular patterned monolith substrates include filters used for molten metals. Examples of regular patterned substrates include monolith honeycomb supports used for purifying exhausts from motor vehicles and used in various chemical processes. Preferred are the ceramic foam structures having irregular passages. Both types of monolith support structures made from conventional refractory or ceramic materials such as alumina, zirconia, yttria, and mixtures thereof, are well known and commercially available from, among others, Corning, Iac.; Vesuvius Hi-Tech Ceramics, Inc.; and Porvair Advanced Materials, Inc. The ceria monolith substrate of the present invention is not available commercially, but can be fabricated using techniques similar to those known in the art.

Although the monolith support used in the present invention is made from ceria (cerium dioxide), a mixture of cerium oxides with $Ce^{4+}$ and $Ce^{3+}$ oxidation states (e.g. $CeO_2$ and $Ce_2O_3$) can also be used. As used herein, the term "ceria" shall include all forms of cerium oxides. It is understood that a ceria monolith substrate or support shall include not only substantially pure compositions of cerium oxides, but also include composites or mixtures of other refractory or ceramic materials wherein the ceria component is greater than about 75%, and preferably greater than about 90%, of the total composition by weight. Examples of such materials include, but are not limited to, zirconia, alumina, yttria and mixtures thereof. In practicing certain embodiments of the invention, it is preferable that the monolith substrate comprises a higher percentage of ceria, e.g., at least about 95%, preferably about 99% of cerium oxides. For example, it has been found that a higher percentage of ceria tends to result in a lower initiation temperature for partial oxidation of hydrocarbons. Furthermore, the ceria monolith used herein will preferably have a porosity of between about 20 and about 80 pores per inch (ppi), and more preferably between about 40 and about 70 ppi.

The ceria monolith substrates have been surprisingly found to be superior to conventional monolith substrates made primarily from other ceramic materials such as alumina, zirconia and mixtures of such materials. Ceria is known to have oxygen storage capacity and it can exchange a certain quantity of oxygen atoms from its structure with the surrounding atmosphere, depending on the availability or lack of oxygen in the surrounding. When oxygen-starved in this manner, it has been found to have a very strong affinity for oxygen, and the subsequent oxygen uptake can be exothermic, generating localized high temperatures. In addition, in the presence of ceria, the metal remains in a substantially reduced form thereby rendering it catalytically more active. It is believed that this occurs since ceria preferentially picks up oxygen first.

In another embodiment, the ceria monolith substrate further comprises titania. A relatively small amount of titania (titanium oxide) is used primarily to improve the fabrication of the ceria monolith substrate and to achieve stability of the monolith substrate. For example, a monolith substrate of pure ceria, which has a relatively high thermal expansion coefficient, may experience substantial shrinkage upon cooling during the fabrication process. It is believed that such shrinkage results in the formation of cracks, especially in larger monolith substrates. It has been found that a small amount of titania added to a slurry of ceria used in fabricating the monolith substrate, significantly improves the fabrication process by reducing or eliminating cracks in the ceria monolith substrate. Such a monolith substrate may be used for supporting a catalyst for catalytic reactions, including partial oxidation and combustion reactions. Thus, titania should be present in a suitable amount to allow fabrication of crack-free and mechanically strong substrates, but its concentration should not be so high as to adversely impact on the effectiveness of the ceria monolith substrate in catalytic processes. The suitable amount of titania may further depend on the size of the substrate and dispersion of the titania within the ceria matrix. Although not exemplified, it is believed that an amount of titania of up to about 3% may typically be used. Higher amounts of titania maybe operable, but are not deemed necessary to achieve the benefits of this embodiment. For example, titania is preferably present in the monolith substrate in an amount between about 0.1% and about 3%, preferably between about 0.5% and about 1.5%, and more preferably about 1%, of the total composition by weight. Although the monolith substrate preferably consists essentially of ceria and titania, other materials such as refractory metal oxide, e.g., zirconia, alumina, yttria and mixtures thereof, may also be present.

As with conventional refractory or ceramic monolith support materials, the present ceria monolith substrates are prepared by casting and firing at high temperatures as known in the art. A wash coat comprising ceria or a different refractory material is then applied to the ceria monolith substrate to increase the surface area within the monolith substrate. Typically, the wash coat will increase the surface area of the substrate from less than 1 meter$^2$/gram (m$^2$/gm) to at least 10 m$^2$/gm. Various ceramic foam structures and their preparation are described in the art and are generally known, and similar preparation techniques can be used here with the ceria and ceria/titania substrates.

The metals used in the present catalysts are selected from certain transition and noble metals of the Periodic Table of Elements. Suitable metals include nickel, cobalt, iron, platinum, palladium, iridium, rhenium, ruthenium, rhodium and osmium, with nickel, platinum, palladium and rhodium being preferred. More preferred are nickel aid rhodium. The most preferred metal of this group is rhodium. The metals may be present on the monolith substrate in the form of metals, metal oxides, metal halides or other metal salts prior to being reduced. Upon reduction, as described below, the metals will be substantially in the metallic form. Generally, from about 1% to 10% by weight of the metal will be deposited on the monolith: substrate (based on the weight of the monolith substrate), and preferably from about 3% to 7% by weight.

The metal is impregnated into the monolith substrate using conventional processes. For example, the ceria or ceria/titania monolith substrates are impregnated with a saturated metal salt solution and allowed to dry at room or elevated temperatures. The substrate is then calcined under suitable conditions as generally known to the skilled artisan.

The metal catalyst should be in a reduced state prior to use in the partial oxidation process, and the reduction can be carried out by contacting it with a reducing environment, preferably at an elevated temperature. For example, after reduction, the monolith substrate may comprise ceria with oxygen present in less than the stoichiometric amount relative to cerium, e.g., $CeO_{2-x}$. Both the metal and monolith substrate should be substantially reduced. For example, the reduction should be sufficient to remove the mobile oxygen from the substrate and bound oxygen from the metal. It was found that when the reduction of a ceria supported catalyst is carried out in substantially pure hydrogen at temperatures greater than about 200° C., the catalyst is sufficiently reduced to initiate the partial oxidation reaction of methane ($CH_4$) at lower temperatures than previously possible. Alternatively, a lower initiation temperature was also achieved when a metal catalyst with a ceria substrate was exposed to a nitrogen purge gas at about 400° C. The degree of reduction of the catalyst is indicated by the speed of pickup of oxygen by the reduced catalyst when exposed to an oxygen containing atmosphere. If the catalyst is not sufficiently reduced, the reaction does not start until a temperature of greater than 350° C. is reached.

The partial oxidation process is conducted by contacting mixtures of the hydrocarbon-containing feed gas and the oxygen-containing feed gas with the metal catalyst (ceria substrate) at contact times ranging from 1 to 500 milliseconds depending on the particular feed gases, catalyst, pressure and space velocity employed. Under typical operating conditions, the feed gas will be introduced at a standard gas hourly space velocity of between about 50,000 and about 500,000 hr$^{-1}$ and preferably between about 100,000 and about 200,000 hr$^{-1}$. The linear space velocity is about 0.5 to 5.0 feet per second. The process is conducted at pressures from about 1 to about 20 atmospheres (atm) and preferably from about 1 to 5 atm. Generally, it has been found that higher space velocities can be employed with higher concentrations of oxygen in the oxygen-containing feed gas.

When the inventive process is carried oat with air and methane in the feed gas mixture having a carbon to oxygen (C:$O_2$) ratio of about 1.7, at a pressure of about 1.5 atm. and at a standard gas hourly space velocity of 120,000 hr$^{-1}$, a gas mixture containing about 40% (by volume) nitrogen, 36% hydrogen, 18% carbon monoxide and trace amounts of methane, carbon dioxide and water is produced at about 800° C. The product gas contains less than 3% carbon dioxide, preferably less than about 2%, and most preferably less than about 1% carbon dioxide.

As mentioned above, the metal catalyst is a singular unit of varying dimensions depending on the size and design of the reactor. In a preferred embodiment, the reactor is a pipe or tube of suitable material and construction having a diameter of between about 1 and 100 inches (between 2.54 cm and 254 cm). The feed gas mixture is fed into one end and the partial oxidation reaction occurs on the metal catalyst with the product gas exiting from the other end. The metal catalyst can also be comprised of multiple monolith units to form an assembly of units disposed in end-to-end arrangements. It is preferred that the metal catalyst have a porosity and orientation so as to minimize the pressure drop of the feed gas through the catalyst. Moreover, multiple individual reactors can be used to form an assembly of reactors disposed in a side-by-side arrangement for increased production. For example, multiple pipes or tubes can be packed together as an assembly to form a single reactor unit with each individual pipe containing the metal catalyst.

The partial oxidation process of the present invention utilizing the metal catalyst permits the reaction to be initiated at temperatures substantially below about 350° C., preferably below 200° C. In order to start the reaction at low temperatures, it is important that the metal catalyst be in the substantially reduced form prior to contacting the catalyst with the feed gas mixture. In the most preferred embodiment, the partial oxidation reaction is initiated at temperatures of less than about 100° C. For the purpose of partial oxidation process, the feed gas mixture of interest preferably has a carbon to oxygen ($C:O_2$) ratio between about 1.5 and about 2, more preferably between about 1.6 and about 1.9. It is understood of course, that reactions having $C:O_2$ ratios of less about 1.5 can also be conducted at low initiation temperatures using metal catalysts of the present invention. However, these reactions may be characterized more as combustion-like processes, instead of partial oxidation processes. In general, feed gas mixtures having higher $C:O_2$ ratios tend to require higher initiation temperatures. However, the use of metal catalysts of the present invention allows partial oxidation reactions to be initiated at relatively low temperatures such as below about 100° C., even for $C:O_2$ ratio as high as 2. Thus, embodiments of the present invention provide an important advantage over conventional partial oxidation processes.

Aside from the $C:O_2$ ratio, the initiation temperature also depends on the number of carbon atoms contained in the hydrocarbon fuel. In general, the lower hydrocarbons (i.e., those with less carbon atoms) require higher temperatures for initiation of the partial oxidation reactions. Therefore, embodiments of the present invention are particularly well-suited for use with lower hydrocarbons, e.g., those containing less than 5 carbon atoms, especially methane, enabling partial oxidation reactions to be initiated at reduced temperatures. Although higher hydrocarbons may not benefit as much as far as initiation temperatures are concerned, embodiments of the present invention can still provide other benefits, such as improved selectivity and higher product yields for $H_2$ and CO, compared with conventional processes carried out using other catalysts.

In another embodiment of the present invention, the metal catalyst is pre-treated, or reduced in situ by exposing the metal catalyst to an exothermic reaction in the presence of a reducing environment prior to conducting the partial oxidation reaction. For example, the metal catalyst can be contacted with a mixture of 4 to 10% hydrogen and 1 to 2% oxygen in nitrogen at a gas hourly space velocity of between 4000 and 10,000 $hr^{-1}$, and at temperatures of less than about 200° C., preferably at room temperature. Since the hydrogen/oxygen reaction is highly exothermic, it heats up the catalyst. Furthermore, by having an excess of hydrogen in the pre-treatment feed mixture, a reducing atmosphere is rendered, so that the catalyst is reduced at the elevated temperature. Such a reaction will reduce the metal catalyst while at the same time elevate the temperature of the metal catalyst to a level at which the partial oxidation reaction can be initiated. Once the metal catalyst reaches the initiation temperature, e.g., less than about 200° C., the hydrogen/oxygen reaction is terminated. The partial oxidation reaction is then initiated by contacting a feed gas mixture of hydrocarbon-containing and oxygen-containing gases (with a $C:O_2$ ratio between about 1.5 and 2.0) with the metal catalyst. Thus, the in-situ catalyst pre-treatment allows the catalyst to be reduced and pre-heated in a single step. The use of such a pre-treatment reaction will also eliminate the need for an external heat source thereby reducing the capital costs of the process. As the partial oxidation process commences, the reaction will continue to transfer heat energy to the catalyst raising the temperature of the catalyst to a range of about 500° C. to 1000° C.

As mentioned above, it has also been found that when the metal catalyst is more completely reduced, the reaction can be initiated at lower temperatures. Thus, it is preferred that the metal catalyst be substantially reduced in order to initiate the reaction at temperatures below about 100° C. The metal catalyst may be reduced, prior to being used in a partial oxidation reaction, by exposing it to a reducing agent such as $H_2$. Alternately, the metal catalyst can also be reduced simply by conducting a partial oxidation reaction with the metal catalyst exposed to a reducing atmosphere. Such a reducing atmosphere may, for example, be characterized by a high $C:O_2$ ratio. Once the metal catalyst is used in the partial oxidation reaction, it is convened into a reduced state. The reduced metal catalyst will remain in the reduced state as long as it is not exposed to air or oxygen alone. Thus, a synthesis gas plant, after a plant shut-down, may be re-started with a feed gas mixture of natural gas and air at about 100° C. or lower, without the need for further treatment of the metal catalyst.

Alternatively, a reduced form of the metal catalyst may also be obtained by purging in pure $N_2$ under high temperature conditions. Furthermore, in the case of freshly prepared metal catalyst, which is already reduced, e.g., by using hydrogen in a furnace, a pre-heating of the catalyst up to about 100° C. may suffice to allow initiation of partial oxidation reactions. Such pre-heating of the catalyst may be carried out by using hot nitrogen, or an exothermic reaction involving hydrogen and oxygen.

It has also been surprisingly observed that, when using the inventive process, the conversion of methane to hydrogen and carbon monoxide is in the range of about 10% to 15% higher than would be expected from conventional partial oxidation processes. Most importantly, the production of unwanted components, especially carbon dioxide, is minimized.

The following examples illustrate the improved partial oxidation process using a metal catalyst with a ceria monolith substrate of the present invention. Both laboratory and pilot plant reactors have been used for partial oxidation reactions. In general, reactions carried out in a pilot plant reactor provide better performance results compared to a laboratory reactor, probably as a result of lower heat loss in the pilot plant reactor.

EXAMPLE 1

A ceria monolith with a ceria washcoat having 65 pores per inch, and obtained from Vesuvius Hi-Tech Ceramics, was impregnated with 6.4% by weight of rhodium metal to prepare the metal catalyst. A laboratory scale reactor containing the reduced metal catalyst monolith was purged with nitrogen gas at 400° C. for 15 minutes and then cooled to about 110° C., still in the presence of nitrogen gas.

A gas mixture containing 45.1% by volume of methane, 26.2% by volume of oxygen and 28.7% by volume of nitrogen was then passed into the reactor containing the metal catalyst at a space velocity of 70,000 $hr^{-1}$ and a temperature of about 110° C. The reaction was initiated at this temperature and there resulted a rapid rise in the reactor temperature to above 800° C. with the production of hydrogen and carbon monoxide.

EXAMPLE 2

The metal catalyst produced in Example 1 was purged with pure hydrogen gas at 200° C. for about 30 minutes in a reactor, then the reactor was cooled to about 50° C. while still in the presence of hydrogen gas. The hydrogen flow was stopped and the reaction mixture employed in Example 1 was then passed over the metal catalyst at a space velocity of 70,000 $hr^{-1}$ and a temperature of 50° C. The partial oxidation reaction commenced at this temperature and the reactor temperature rapidly rose to above 800° C. with the production of hydrogen and carbon monoxide.

COMPARATIVE EXAMPLE A

A metal catalyst was prepared as described in Example 1, except the monolith support was made of zirconia (commercially obtained from Vesuvius Hi-Tech Ceramics). The same amount of rhodium metal was loaded on the zirconia support.

When attempting to start the reaction by following the procedures described in Example 1 using a hot nitrogen purge or Example 2 using a hot hydrogen purge, the reaction could not be initiated until a temperature of about 350° C. was reached.

EXAMPLE 3

A partial oxidation reaction was initiated following the same procedure as described in Example 1 with the same metal catalyst which was used in Examples 1 and 2. A gaseous mixture containing 14.2% by volume of oxygen, 60.2% by volume of nitrogen and 25.6% by volume of methane was then fed to the reactor containing the monolith catalyst (instead of the mixture which was used to initiate the reaction) at a space velocity of 120,000 hr$^{-1}$. The reaction temperature remained at about 700° C. The resulting product gas contained 27.4% hydrogen, 13.3% carbon monoxide and 48.7% nitrogen, with 2.7% carbon dioxide, 5.8% methane and 2.1% water. The conversion rate of methane and the yield of hydrogen and carbon monoxide were calculated from the measured concentrations in the product. The results are shown in Table 1 below.

COMPARATIVE EXAMPLE B

A comparative example was prepared as described in Example 3 except the monolith support was made of zirconia (also commercially obtained from Vesuvius Hi-Tech Ceramics). The reaction was initiated at about 350° C. The conversion and yield measurements were calculated as in Example 3 and the results are shown in Table 1.

TABLE 1

| | $CH_4$ Conversion | Yield [($H_2$ + CO)/CH4] |
|---|---|---|
| Example 3 | 86.2% | 2.34 |
| Comparative Example B | 76.2% | 2.02 |

EXAMPLE 4

A partial oxidation reaction similar to Example 3 was initiated using the same feed gas mixture. However, in this example, heat loss from the reactor was reduced or eliminated by minimizing the temperature difference between the reactor and its surroundings. The reaction temperature was maintained at about 800° C. The resulting product gas contained 31.2% hydrogen, 16.6% carbon monoxide and 45.3% nitrogen, along with 2.0% carbon dioxide, 2.3% methane and 2.6% water. It is believed that the reduced heat loss (compared to Example 3) led to improved reaction performance such as an increase in the CO:$CO_2$ ratio from about 5 to at least about 8. Example 4 also resulted in improved $CH_4$ conversion and product yield when compared with a comparative example using a zirconia-based monolith substrate. For example, a $CH_4$ conversion of about 87.8% and a synthesis gas yield [($H_2$+CO)/$CH_4$] of about 2.48 were obtained, compared with about 78.6% conversion and a yield of about 2.14 in the case of the zirconia-based monolith substrate.

EXAMPLE 5

A two-layer catalyst assembly comprising a 7" diameter, ½" thick ceria monolith impregnated with about 6 wt. % Rh, in the reduced form, followed by a 7" diameter, 1" thick zirconia monolith similarly loaded with Rh, was held in a pilot plant reactor, which is refractory-lined. Hot nitrogen was passed over the metal catalyst to heat the catalyst from an initial temperature of about 24° C. to about 100° C. in about 10 minutes. The nitrogen flow was then stopped, and a flow of a gas mixture containing air and natural gas (29% natural gas, 14.8% $O_2$, balance nitrogen), with a C:$O_2$ ratio of about 2, was commenced at a rate of about 2500 standard cubic feet per hour (SCFH). The catalyst layers are arranged such that the feed gas mixture first comes in contact with the catalyst supported on the ceria monolith. Initiation of the reaction was indicated by a sudden rise in the catalyst temperature which reached over 600° C. in less than 3 minutes, with a product composition showing the presence of about 30% $H_2$ and 15% CO. This example shows that even with the high C:$O_2$ ratio and high nitrogen content in the feed gas mixture, the reaction can still be initiated at less than about 100° C. The final gas product, which was dried before analysis, has a composition of 36.2% $H_2$, 19.5% CO, 0.7% $CO_2$, less than about 1% $CH_4$ and balance $N_2$. When identical experiments in the same pilot plant reactor were performed with Rh loaded on a zirconia based substrate alone, i.e., without the ½" ceria monolith substrate, initiation of the partial oxidation reaction always required a temperature of about 350° C.

The above examples illustrate the initiation of partial oxidation of methane at temperatures substantially below about 350° C., e.g., below about 200° C., and preferably below about 100° C., when using the inventive process with feed gas mixtures having high C:$O_2$ ratios. Example 5 further illustrates that partial oxidation of hydrocarbons, including those with low number of carbon atoms such as methane, can be performed at low initiation temperatures even with air, as opposed to oxygen-enriched air or pure oxygen. As shown in Table 1, the present process employing rhodium supported on a ceria monolith exhibited higher methane conversion rates than rhodium supported on a zirconia monolith. In addition, the yield of hydrogen and carbon monoxide (synthesis gas) was appreciably higher for the inventive process. Furthermore, the above examples illustrate that a high CO selectivity can also be achieved. For example, a CO:$CO_2$ ratio of at least about 4 or 5 is readily obtained in the product compositions, and ratios of at least about 10, or even above 20 can also be achieved.

It should be understood that the subject invention is not limited by the examples set forth above. The scope of this invention is intended to include equivalent embodiments, modifications and variations falling within the scope of the attached claims.

What is claimed is:

1. A monolith substrate for supporting a catalyst for catalytic reactions, consisting essentially of ceria and between about 0.1% and about 3% by weight of titania.

2. The monolith substrate of claim 1, consisting essentially of about 1% by weight of titania and about 99% by weight of ceria.

3. A metal catalyst for reactions, comprising:
   a metal supported by a monolith substrate consisting essentially of ceria and between about 0.1% and about 3% by weight of titania; wherein said metal is selected from the group consisting of transition metals and noble metals.

4. The metal catalyst of claim 3, wherein said metal is selected from the group consisting of nickel, cobalt, iron, platinum, palladium, iridium, rhenium, ruthenium, rhodium, osmium and combinations thereof.

5. The metal catalyst of claim 3, wherein said metal catalyst is substantially reduced to remove mobile oxygen from said monolith substrate and bound oxygen from said metal.

6. The metal catalyst of claim 3, wherein said monolith substrate has a porosity between about 20 and about 80 pores per inch.

* * * * *